US005618090A

United States Patent [19]
Montague et al.

[11] Patent Number: 5,618,090
[45] Date of Patent: Apr. 8, 1997

[54] MOVABLE HOSPITAL ROOM EQUIPMENT COLUMN

[75] Inventors: Edgar G. Montague; Christopher F. Yonge, both of Charlotte; Robin E. Smith, Moorseville, all of N.C.

[73] Assignee: Medaes, Inc., Norcross, Ga.

[21] Appl. No.: 440,340

[22] Filed: May 12, 1995

[51] Int. Cl.$^6$ .......................... A47B 81/00; A47C 31/00
[52] U.S. Cl. ................. 312/209; 312/246; 312/223.6; 5/503.1; 5/658; 248/282.1; 211/26
[58] Field of Search ................ 312/7.2, 209, 223.1, 312/223.6, 246, 249.8; 248/131, 145, 122.1, 282.1, 289.11; 211/26, 168; 5/600, 503.1, 658

[56] References Cited

U.S. PATENT DOCUMENTS

| | | |
|---|---|---|
| 3,032,057 | 5/1962 | Mays . |
| 3,762,398 | 10/1973 | Schefke et al. . |
| 4,042,287 | 8/1977 | Hallen ...................................... 312/209 |
| 4,338,485 | 7/1982 | Fullenkamp ............................ 312/209 |
| 4,475,322 | 10/1984 | Russo et al. ............................ 312/209 |
| 4,572,594 | 2/1986 | Schwartz ................................ 312/209 |
| 4,811,435 | 3/1989 | Foster et al. ............................... 5/60 |
| 4,821,470 | 4/1989 | Kappers et al. ............................ 52/36 |
| 4,985,946 | 1/1991 | Foster et al. ................................ 5/60 |
| 5,007,688 | 4/1991 | Bayerlein et al. ....................... 312/209 |
| 5,072,906 | 12/1991 | Foster ....................................... 248/122 |
| 5,077,843 | 1/1992 | Foster et al. ................................ 5/60 |
| 5,186,337 | 2/1993 | Foster et al. .............................. 211/26 |
| 5,284,255 | 2/1994 | Foster et al. ....................... 248/131 X |
| 5,299,338 | 4/1994 | Foster ........................................ 5/658 |
| 5,398,359 | 3/1995 | Foster ........................................ 5/658 |
| 5,480,212 | 1/1996 | Marconet ............................... 5/658 X |
| 5,490,652 | 2/1996 | Martin ................................. 248/282.1 |

Primary Examiner—Peter M. Cuomo
Assistant Examiner—James O. Hansen
Attorney, Agent, or Firm—Patent Law Offices of Albert S. Anderson

[57] ABSTRACT

The column has ceiling mounted gas and electrical conduits leading into a top portion of the column through a pipe. A double articulating arm permits moving of the column on a base supported by wheels through 340° around the bed of a patient. A brake in the base prevents inadvertent movement of the column. A support arm mounted on the pipe below the double articulating arm supports a patient monitor. Front and rear vertical columns joined by horizontal members provide open access to patient service equipment including gas couplers and electrical outlets.

12 Claims, 15 Drawing Sheets

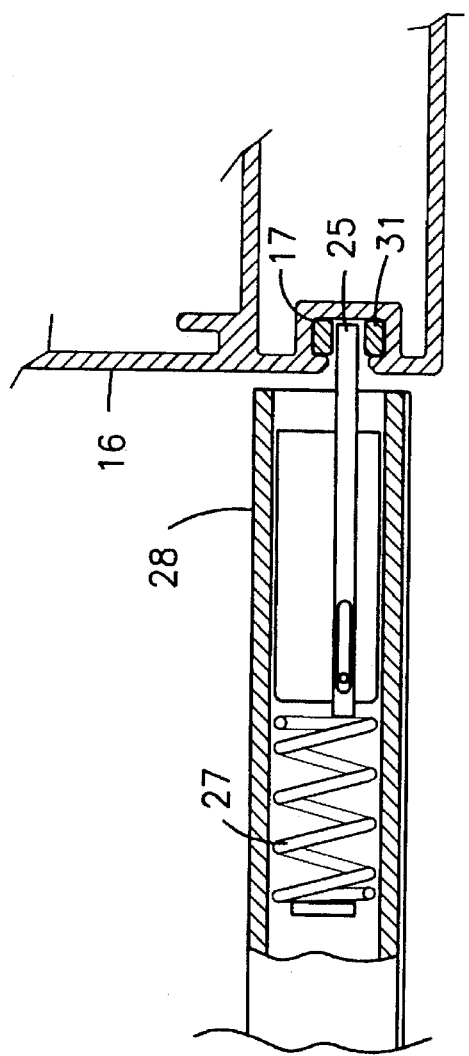
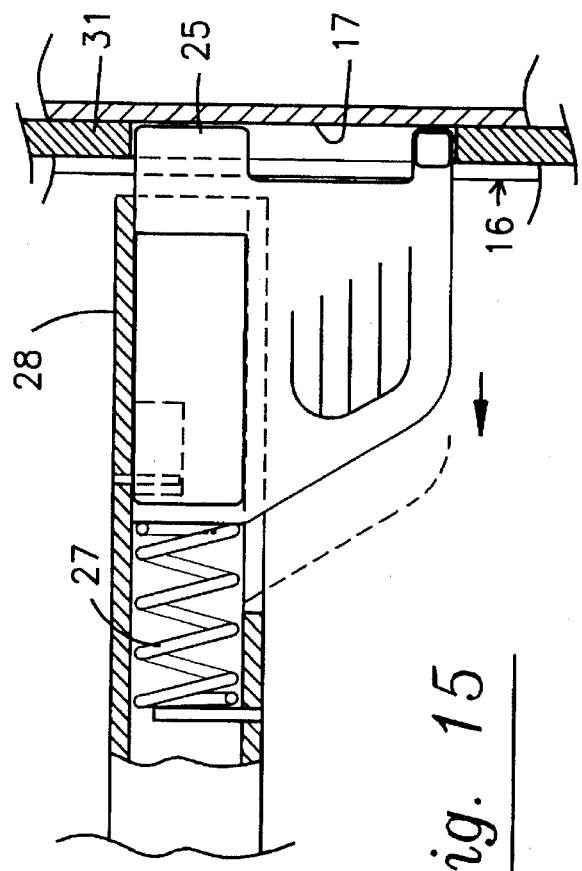
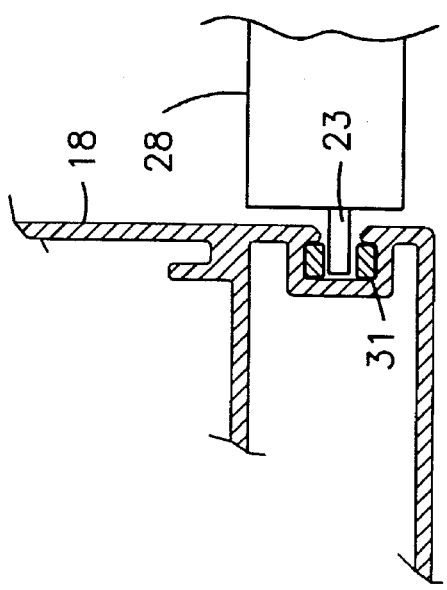
Fig. 14
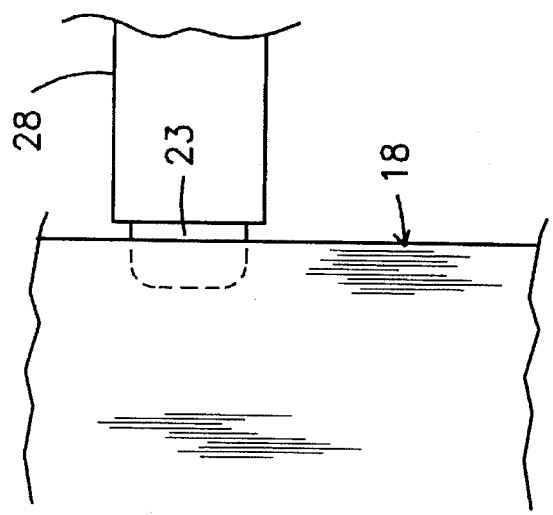
Fig. 15

MOVABLE HOSPITAL ROOM EQUIPMENT COLUMN

BACKGROUND OF THE INVENTION

This invention relates to an equipment column for providing patient life support services in a self contained unit. More particularly, it refers to an equipment column supporting heavy patient care equipment and movable around a patient without moving the patient.

Self contained stand alone equipment columns are well known as described in U.S. Pat. Nos. such as 3,032,057; 4,475,322; 5,007,688 and 5,107,636. U.S. Pat. No. 3,032,057 describes an early version of a hospital recovery service unit which is placed in a retracted position above each bed. The drawings show the device connected to an overhead for supply of electrical and air service. The unit has a vertical guide with a generally rectangular downwardly extending portion. There is no suggestion that this particular device can be extended to the floor or placed on rollers for moving around the bed of a patient.

U.S. Pat. No. 4,475,322 describes a medical power service column for use in a hospital room. The service facilities come in from the ceiling, but the column is not movable and is not placed on any rollers or other device for movement. As seen in FIG. 8, there are holes in the bottom for permanently securing the unit to the floor of the patient's room.

U.S. Pat. No. 5,007,688 describes a wheeled intensive care unit which contains various pager, monitor and supply systems. The lower section is mounted on rollers for movement of the unit. An intermediate incline service includes liquid dosing units and an upper section includes a viewing and indicator unit. An extension arm mounted on the lower portion extends outwardly on one side of the unit. This extension arm is supported on a track within a hollow compartment formed in the lower section. This allows the extension arm to be positioned on either a first side or a second side of the lower section. Electrical supply lines are attached to the unit to enable it to be connected to wall mounted power sounds.

The column equipment in U.S. Pat. No. 5,107,636 requires exposed service lines going to the column from a source point.

Some of the prior art equipment columns such as shown in U.S. Pat. Nos. 4,338,485 and 4,821,470, are permanently wall mounted or are mounted at the head of a patient's bed as shown in U.S. Pat. No. 5,072,906 and are difficult to reach, particularly when several hospital personnel are engaged in procedures at the same time.

Some columns are suspended from the ceiling such as shown in U.S. Pat. No. 5,186,337. This patent reference describes an upper arm of the column pivotally mounted to the ceiling and a lower arm pivotally mounted on the floor. A simple pivotal axis for the arms passes through the head end of the patient's bed. Although no service lines outside the column are visible, the mobility of the column is restricted to the area around a single pivot axis.

U.S. Pat. No. 5,299,338 describes a system for moving around a bed of a patient. The system is suspended from the ceiling and has no rollers on the bottom portion. The patient care units are mounted on arms that swing about pivot axies passing through either or both ends of a patient's bed. The instruments on the power column can be moved directly to the side of a patient. The entire power column 20 is movable to either side of the bed. There are no wheels to the power column although there are apparently wheels on the bed to which the power column is attached. This device moves only in conjunction with the bed.

An improved stand alone equipment column is needed which is more versatile in its use. The ability to move an equipment column up to 340° around a patient's bed would provide greater flexibility to care personnel. Articulating arms for supporting monitor equipment attached to the movable equipment column would provide even greater flexibility to the caregiver.

SUMMARY OF THE INVENTION

In accordance with this invention, the disadvantages of prior art equipment columns are overcome by the equipment column described herein. The invention is a movable medical equipment support column providing internally mounted gas rails and electrical raceways with no exposed service supply conduits. Ceiling mounted conduits lead into a top portion of the equipment support column having two pair of oppositely positioned vertically extending front and rear frame members joined at the top portion with a cap containing raceways for receiving overhead conduits. A base structure supports the bottom of the frame members and contains four casters controlled by a foot operated or an electrical brake system.

Multiple horizontally extending cross members interconnect oppositely positioned vertical frame members. These cross members support miscellaneous hospital equipment, A shaft connecting to the equipment support column frame has a pivotally mounted support arm for a patient monitor at a bottom end and a first end of a first arm of a double articulating arm at a top end. The first end of the second arm of the double articulating arm connects to the ceiling for receipt of gas line and electrical line systems.

The front and rear vertical columns and cap contain raceways for receiving electrical conduits and gas lines from the double articulating arm. The equipment support column accessible from all sides is thus fully self contained with no exposed gas or electrical conduits and can move 340° around the bed of a patient,

BRIEF DESCRIPTION OF THE DRAWINGS

The invention may be best understood by those having ordinary skill in the art by reference to the following detailed description when considered in conjunction with the accompanying drawings in which:

FIG. 14 is a plan sectional view of the spring loaded equipment rail.

FIG. 15 is a side elevational view of the spring loaded equipment rail.

DETAILED DESCRIPTION OF THE INVENTION

Figure 1:
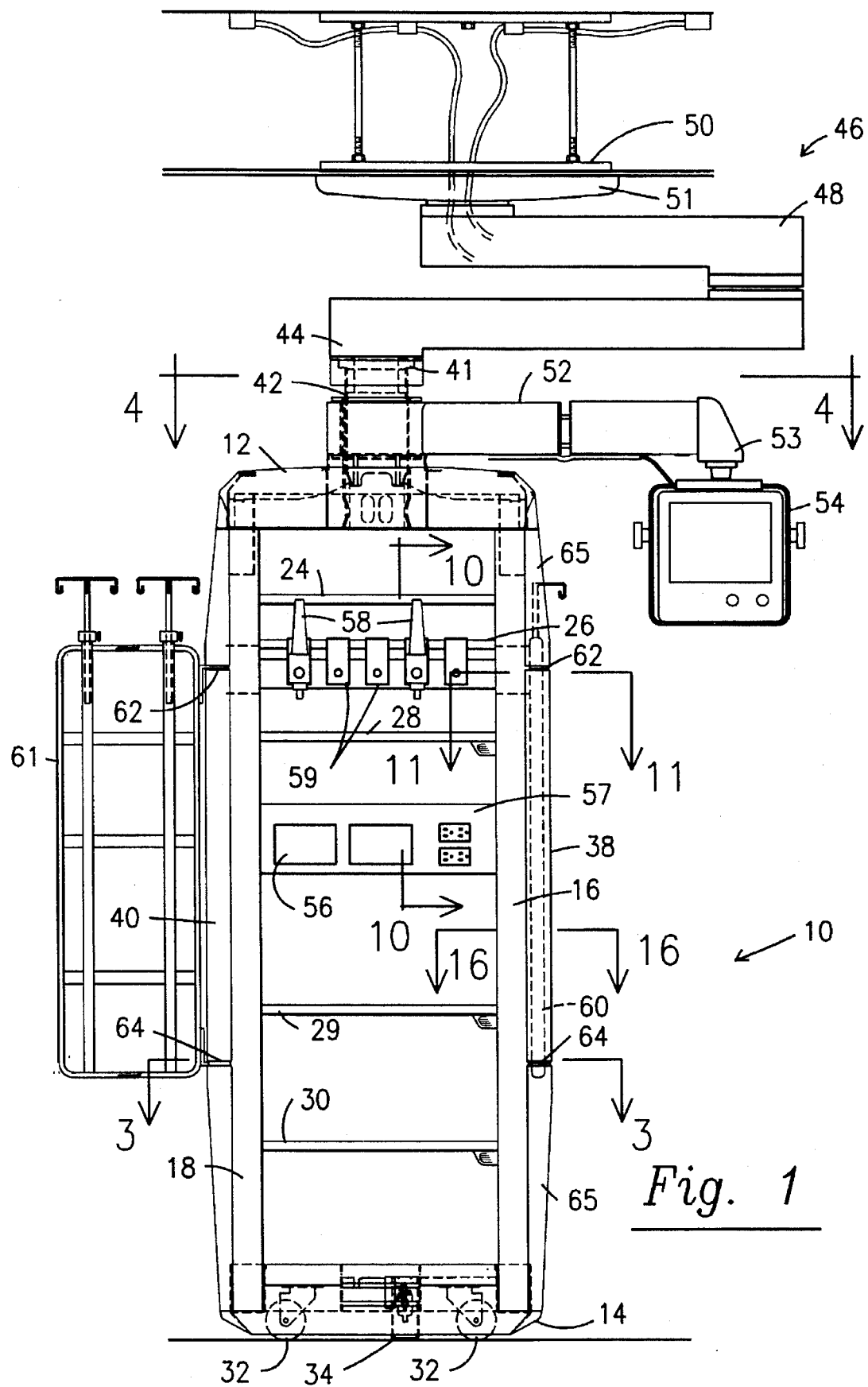
FIG. 1 is a front elevational view of the movable hospital room equipment column of this invention.
Figure 2:
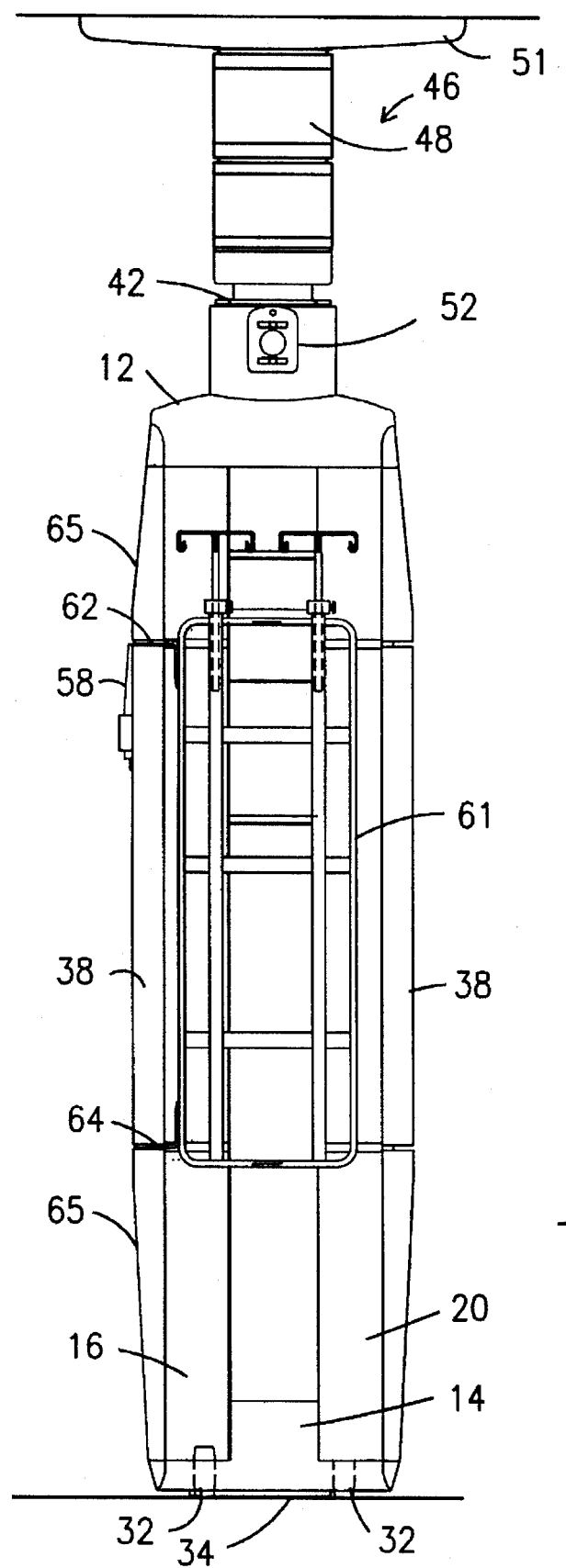
FIG. 2 is a right side elevational view of the movable hospital room equipment column of FIG, 1, FIG, 3 is a cross sectional top plan view along lines 3—3 of FIG. 1.

Throughout the following detailed description, the same reference numerals refer to the same elements in all figures.

Figure 3:
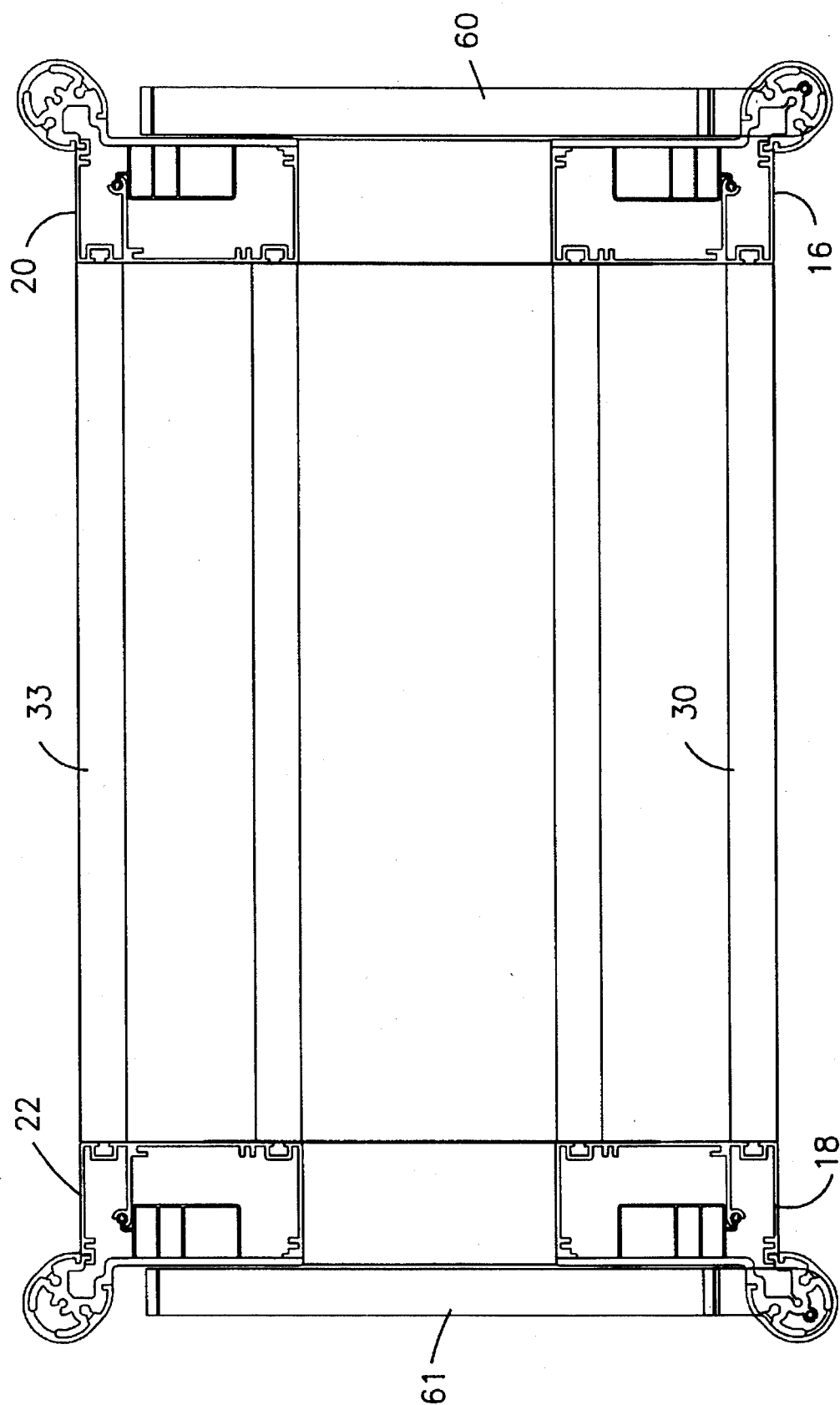
Figure 4:
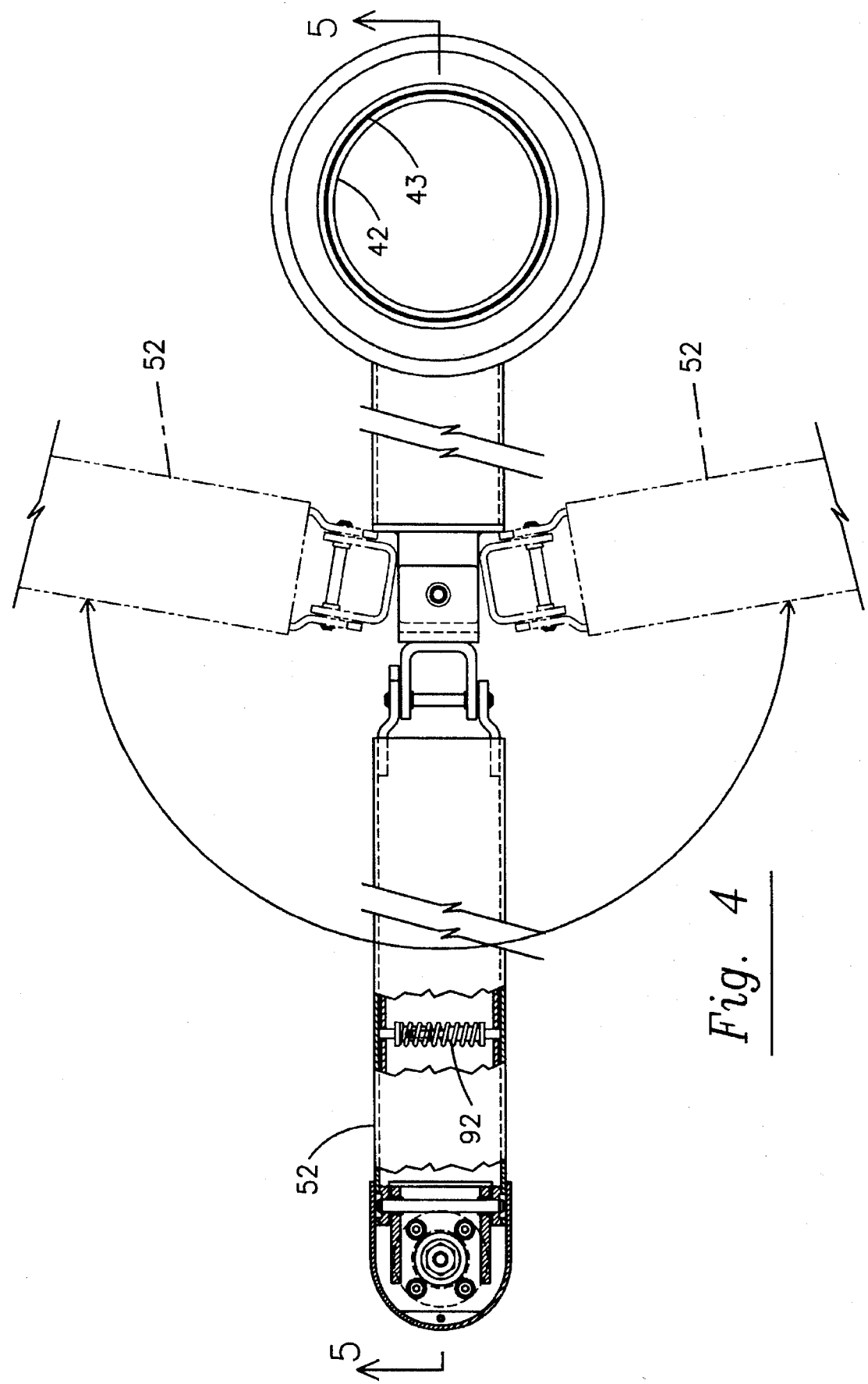
FIG. 4 is a cross sectional top plan view along lines 4—4 of FIG. 1.
Figure 5:
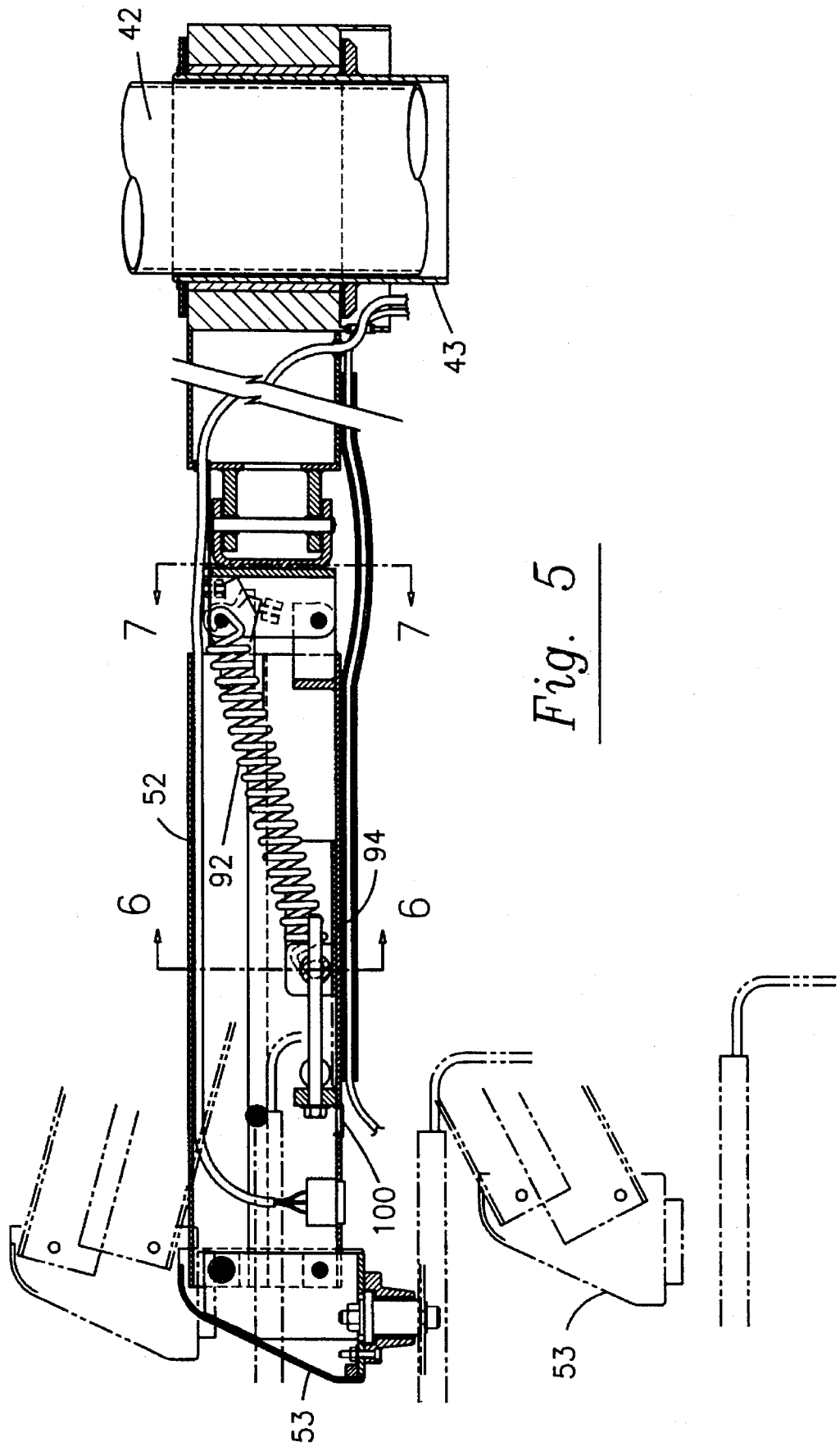
FIG. 5 is a longitudinal cross sectional view in elevation of the monitor support arm along lines 5—5 of FIG. 4.
Figure 6:
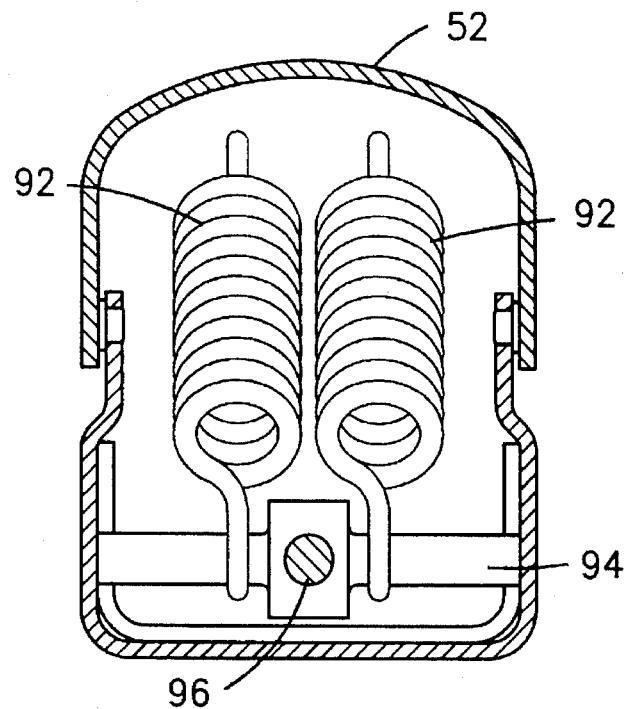
FIG. 6 is a cross sectional view through 6—6 of FIG. 5.
Figure 7:
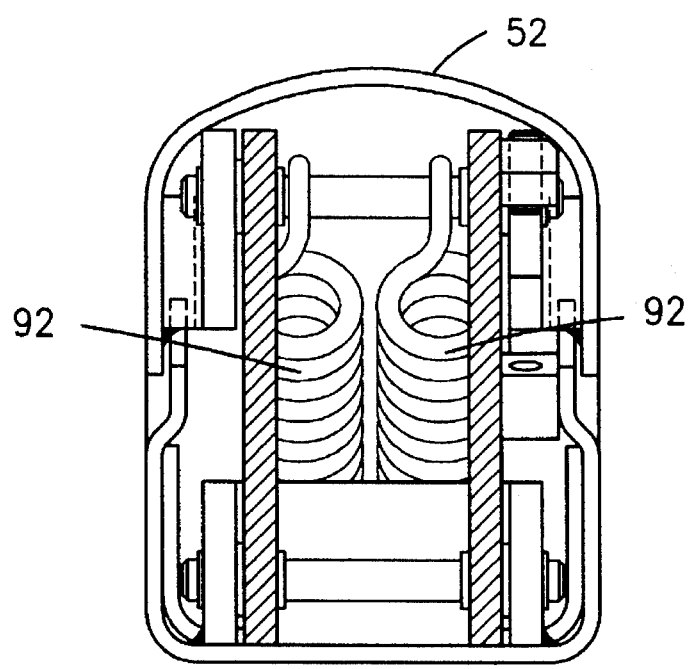
FIG. 7 is a cross sectional view through 7—7 of FIG. 5.
Figure 20:
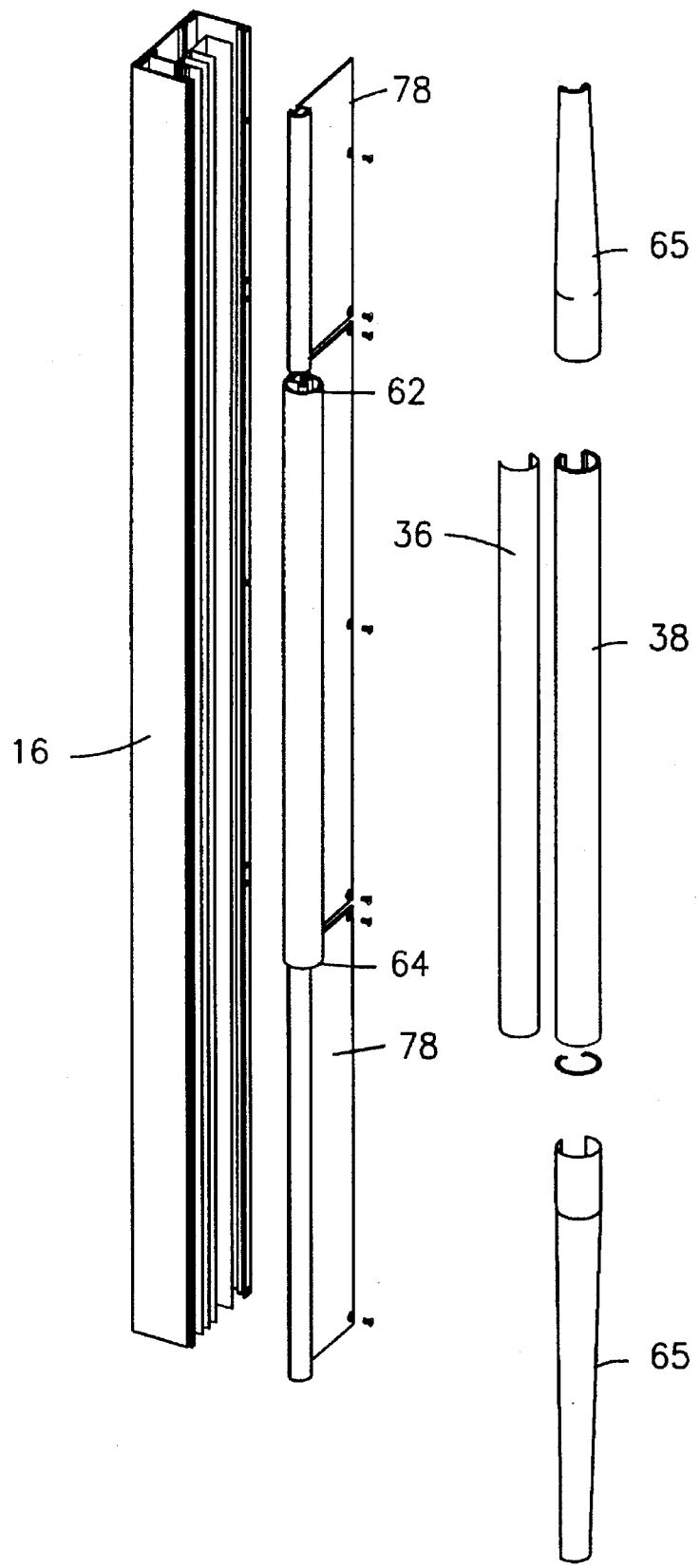
FIG. 20 is an exploded view of a front vertical column.

The movable medical equipment support column 10 is shown in FIG. 1 as having an overhead cap 12 and a base 14 connected by a pair of front frame members 16 and 18 and a pair of rear frame members 20 and 22. The front frame members 16 and 18 are interconnected by multiple front horizontally extending equipment rails 24, 26, 28, 29 and 30. Corresponding multiple rear horizontally extending cross members 33 interconnect frame member 20 and 22 as seen in FIG. 3. A fixed central housing 57 contains internal low voltage 73 and high voltage 71 components. The base member 14 has mounted therein multi- directional casters 32, usually four in number, held in place by a brake pad 34, seen in FIGS. 21 and 22. The brake pad 34 is electrically operated by a motor assembly 66 which is actuated by membrane switch 36 within handle 38 as seen in FIG. 20. Alternatively it can be operated by a foot peddle 67. Brake pad 34 is released electrically by pressing handle 38 or 40 to depress membrane switch 36. Handles 38 and 40 cover the middle plate 80 of front frames 16 and 18, respectively.

Figure 8:
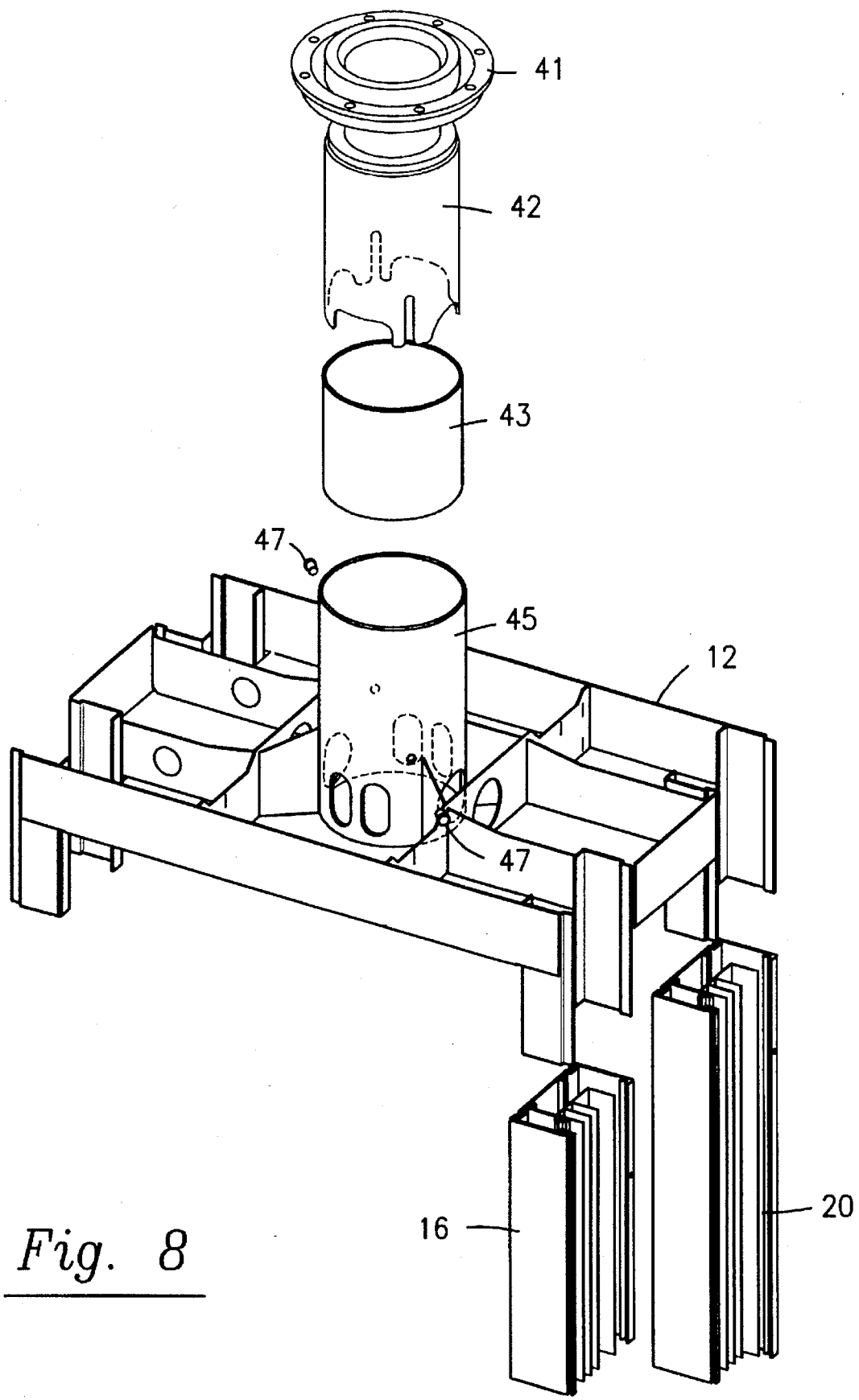
FIG. 8 is an exposed view of the cap without its cover.

As seen in FIGS. 1 and 8, pipe 42 connects through flange 41 at an upper end, a first arm 44 of two articulating arms 46. Flange 41 constitutes the top of pipe 42. The second articulating arm 48 is attached to a ceiling mounted support plate 50. A ceiling cover 51 provides a decorative addition. A monitor support arm 52 is attached to a lower end of the pipe 42, just above cap 12. Support arm 52 has a pivoting bracket 53 attached to monitor 54 at an end distal from the pipe 42. A bushing 43 is pressed into a support tube 45 and screws 47 prevent rotation of pipe 42 within the support tube 45. Monitor 54 is electrically connected to a computer (not shown) mounted within the movable column 10 on a shelf 24.

Figure 10:
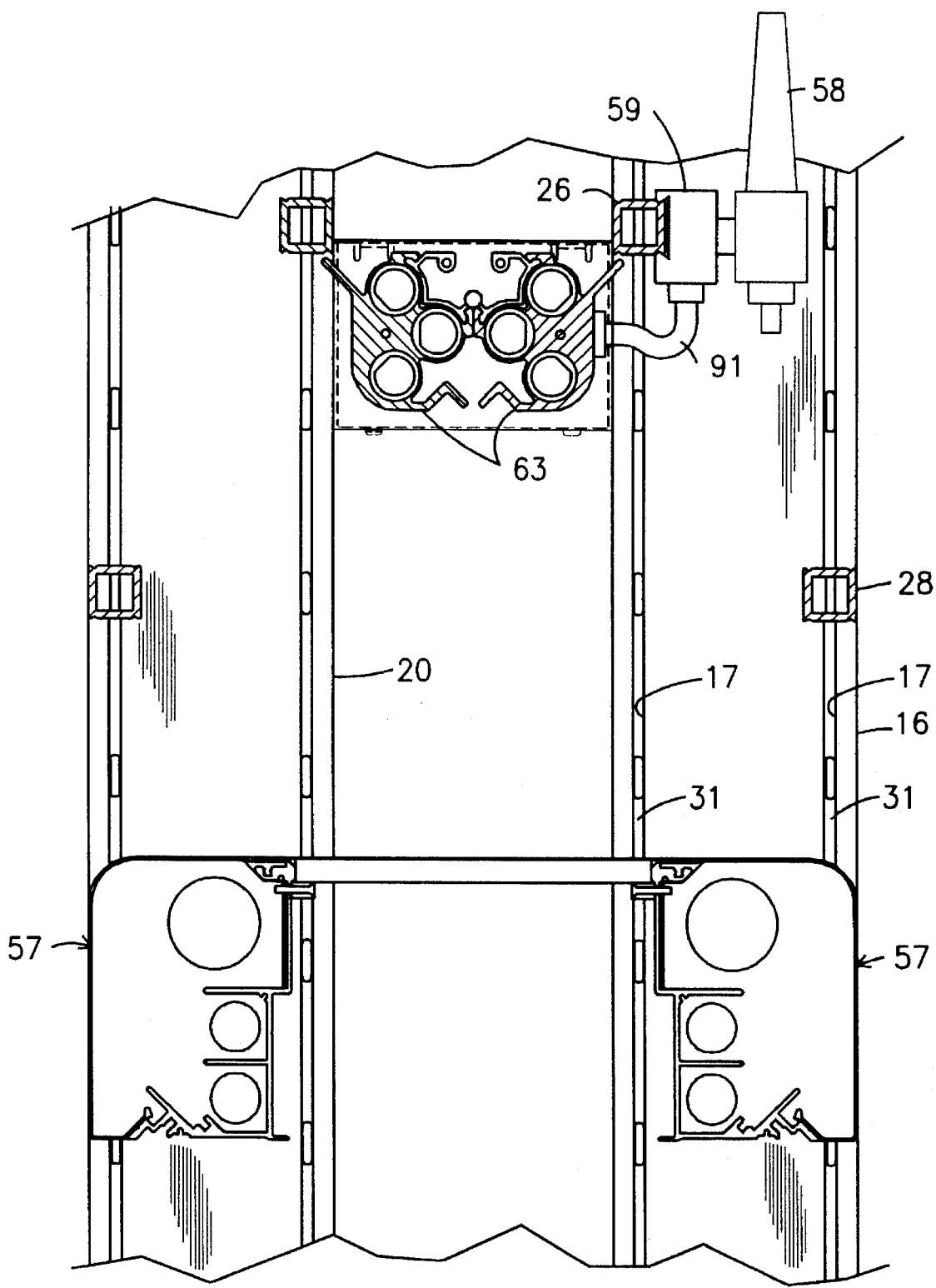
FIG. 10 is a top plan cross sectional view along lines 10—10 of FIG. 1.

A gas flow meter 58 is attached to a gas block 59 mounted on the horizontal member 26. The vertical members 16, 18, 20 and 22 have internal raceways to route gas conduits 68 to the gas rail 63. The gas rail 63 is connected to a flow meter 58 by a gas line hose 91 shown in FIG. 10.

The horizontal members 28, 29 or 30 are spring mounted in channels 17 of vertical columns 16, 18, 20 and 22, as seen in FIGS. 14 and 15. Horizontal members 24 and 26 are fixed to receive shelf assemblies. Each vertical frame member has an inside channel 17 to receive ends of a horizontal member 28. One end 23 is fixed and the other end 25 is operated by a spring 27. A steel insert 31 fits in channel 17 to hold end 23 or 25.

Intravenous (I.V.) support structures 60 and 61 are pivotally mounted on each side of handle 38 and 40, respectively. The support units 60 and 61 are mounted above and below the handles 38 and 40 at points 62 and 64.

Figure 13:
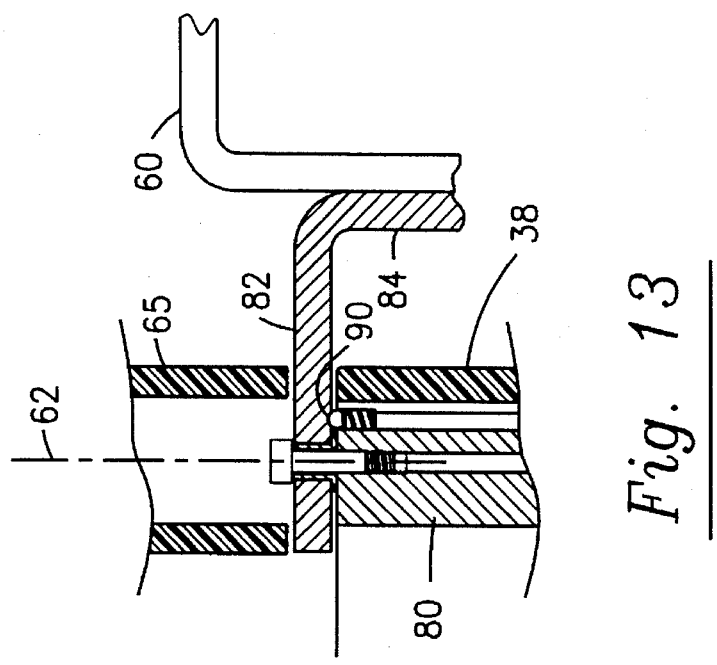
FIG. 13 is a sectional view through lines 13—13 of FIG. 11.
Figure 12:
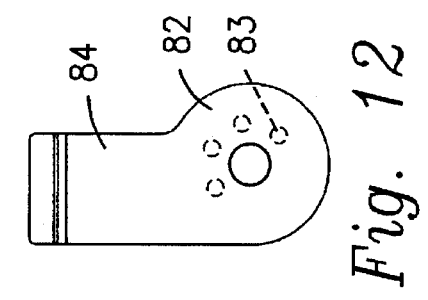
FIG. 12 is a top plan view of a hinge for an equipment arm.
Figure 11:
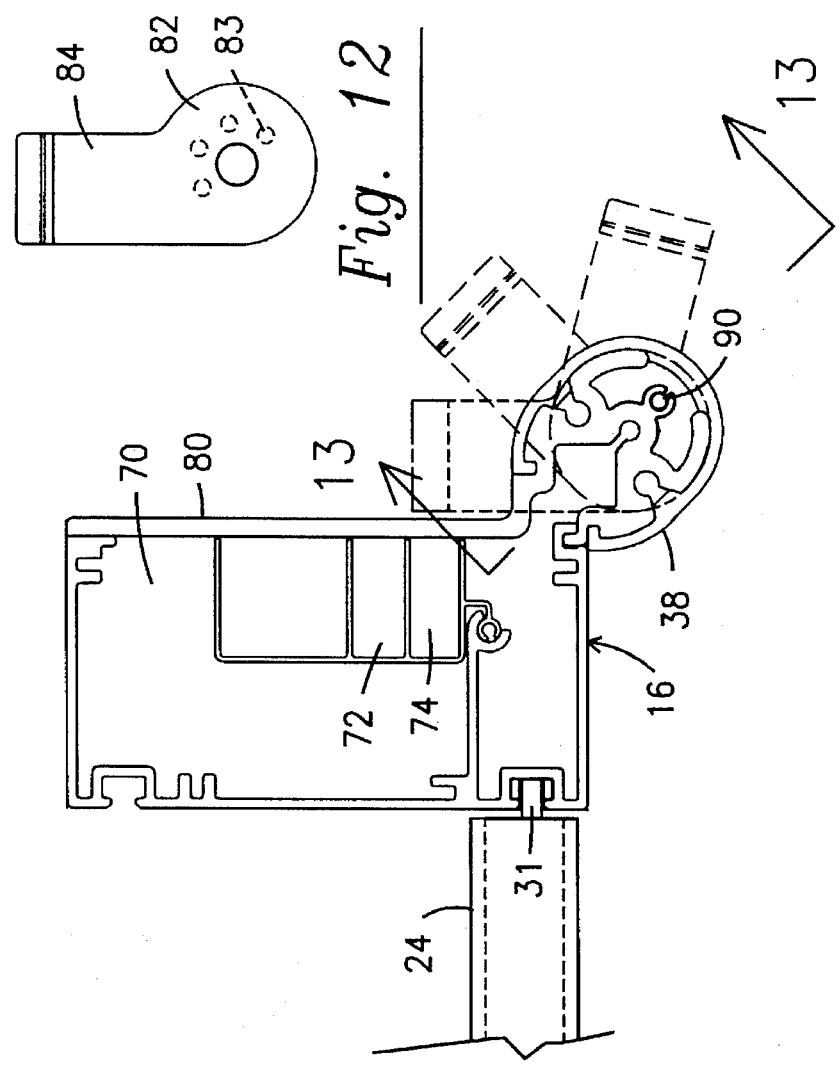
FIG. 11 is a sectional plan view taken along lines 11—11 of FIG. 1.
Figure 19:
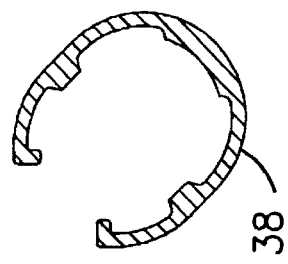
FIG. 19 is a sectional view of the rubber bumper for the vertical column.
Figure 18:
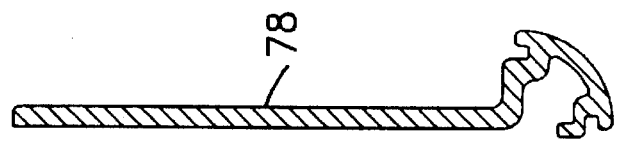
FIG. 18 is a top and bottom sectional view of the vertical column extrusion cover.
Figure 17:
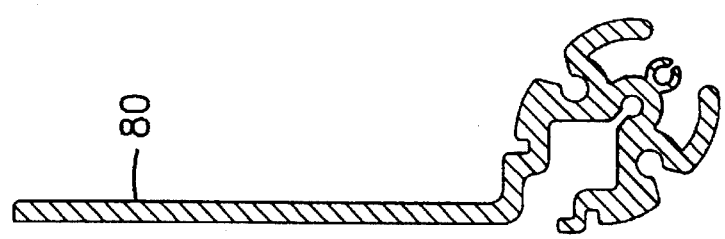
FIG. 17 is a plan sectional view of middle vertical column extrusion member shown in FIG. 13.
Figure 16:
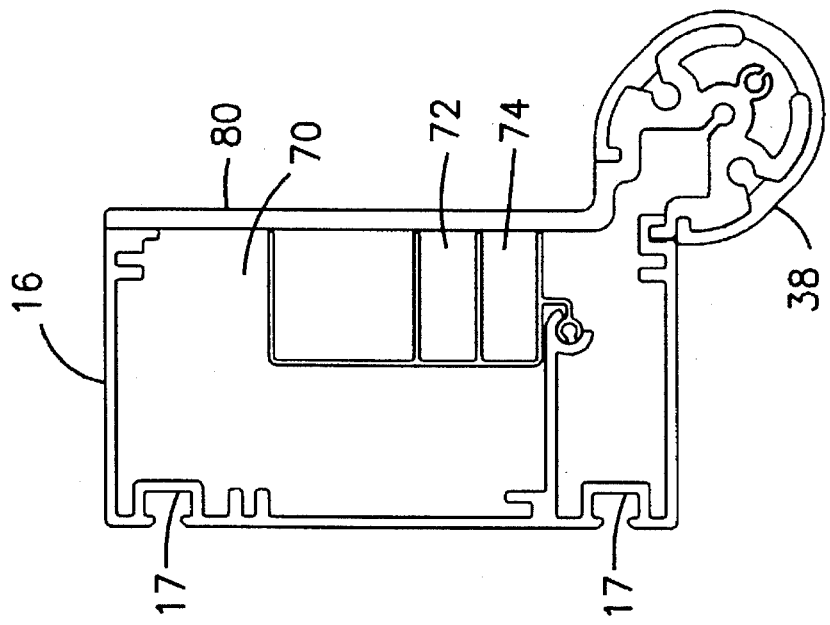
FIG. 16 is a sectional view along lines 16—16 of FIG. 1.

The I.V. support structures 60 and 61 are attached to a vertical frame member as shown in FIGS. 11–13. The vertical frame member 16 contains a gas raceway 70 and electrical raceways 72 and 74. The vertical frame member has an extruded aluminum housing 76 with end cover plates 78. A central cover plate 80 is screwed in place between the pivot points 62 and 64 as seen in FIG. 20. The rounded handle 38 and bumpers 65 cover plates 80 and 78, respectively. Rotating pivot bracket 82 at the end of arm 84 of the support structure 60 or 61 engages the end of cover plate 80 at pivot point 62. Movement of a snap over detents 83 actuated by a caregiver allows the rotating plate 82 to rotate to the next locking position engaged by a spring loaded ball bearing 90. The support structure 61 can swing outwardly from support column 10 about 135° and can fit flush between frame members 18 and 22 when not in use. In like manner, support structure 60 can swing outwardly from a position between frame members 16 and 20.

As shown in FIGS. 4–7, monitor support arm 52 supported by pipe 42 has a patient monitor 54 attached at a point distal from pipe 42. A pair of springs 92 mounted within support arm 52 are attached at one end to a shaft 94 which moves in response to an adjustment arm 96 mounted in a block at an end distal from the shaft 94. An access hole 100 permits adjustment of arm 96 so that tension on springs 92 can be greater or lesser depending on the weight of the monitor 54.

Figure 9:
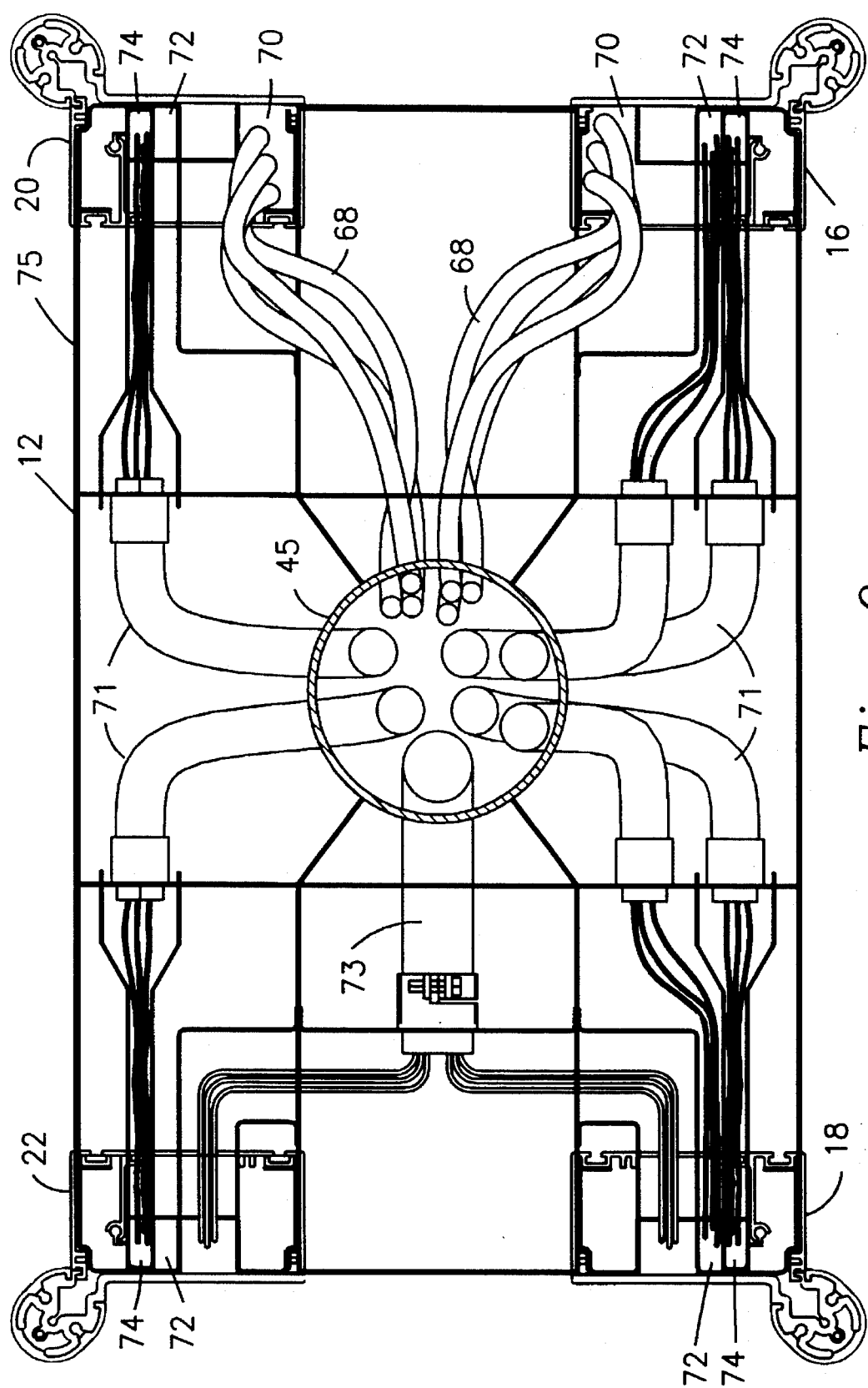
FIG. 9 is a top plan view of the interior of the cap with gas lines and electrical conduits in place.

Cap 12 feeds the various gas lines 68 and high voltage electrical conduits 71, and low voltage electrical conduits 73, from the support tube 45 to the gas raceway 70 and electrical raceways 72 and 74 in the vertical columns 16, 18, 20 and 22 as shown in FIGS. 8 and 9. Both low voltage lines 73 and high voltage lines 71 are contained in separate conduits.

Figure 21:
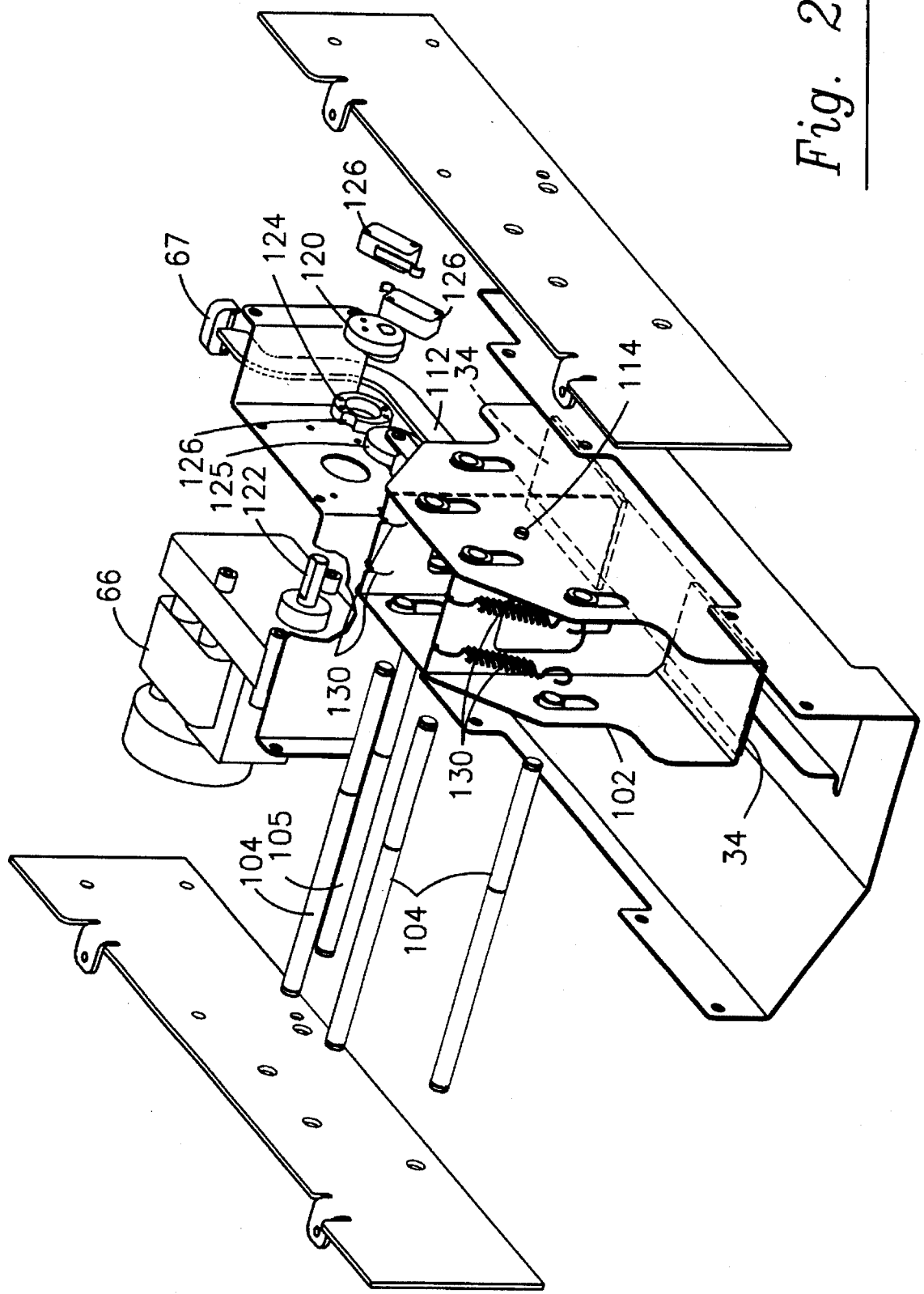
FIG. 21 is an exploded view of the motor assembly and brake pad in the base member.
Figure 22:
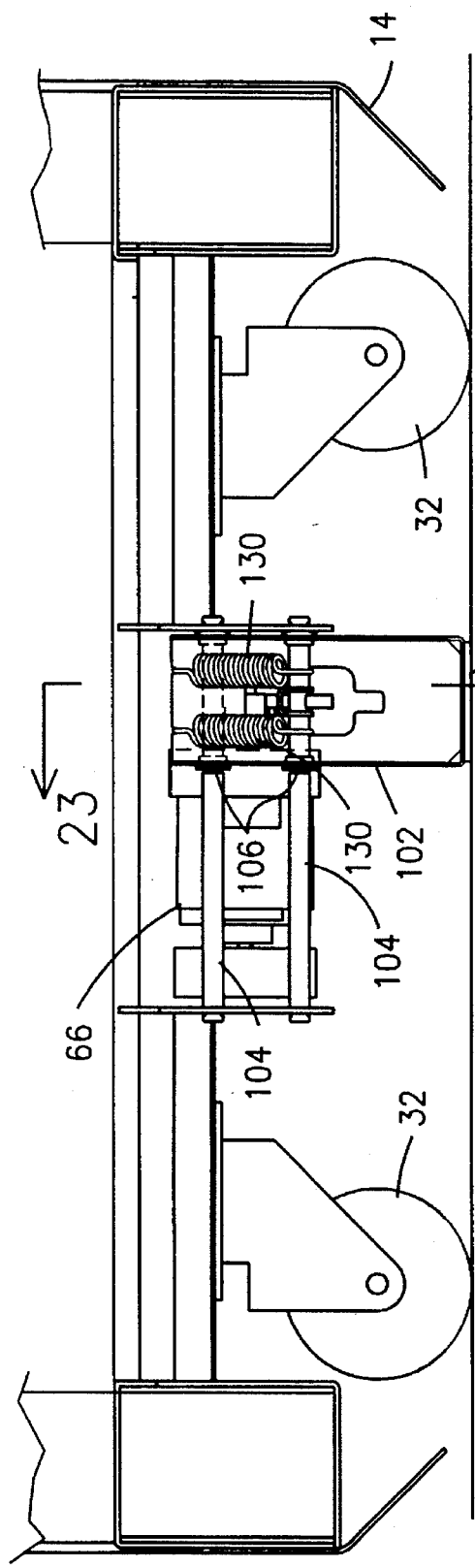
FIG. 22 is a side view of the wheels located in the base member.
Figure 23:
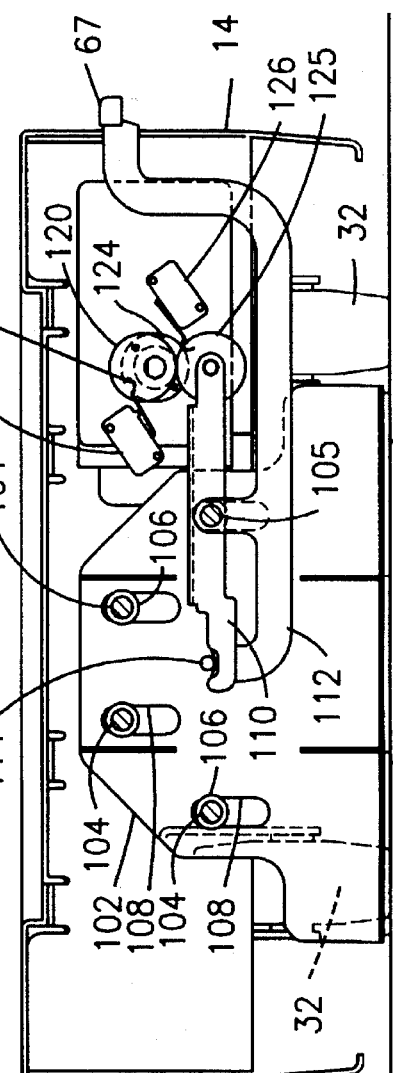
FIG. 23 is a sectional view through lines 23—23 of FIG. 22.

As seen in FIGS. 21-23, the brake assembly has brake pads 34 affixed to the underside of U-shaped bracket 102. The bracket 102 is held in parallel respect to the floor surface by shafts 104 and bushings 106 which allow bracket 102 to travel along the vertical slots 108. Shaft 105 creates a pivot point for mechanical lifting arm 110 and manual lifting of arm 112. When implemented, arm 110 pivots about shaft 105 and exerts vertical force on shaft 114. In the event of a power outage to motor 66, manual release 67 is depressed, forcing arm 112 to exert vertical force on shaft 114 thereby releasing the brake mechanism. The mechanical lifting of shaft 114 is coordinated by rotating cam 120 which is asymmetrically attached to motor shaft 122. As cam 120 is rotated, the outer circumference is selectively depressing or releasing wheel 125 at distal end of arm 110 with respect to shaft 114. Switch cam 124 is affixed to the motor side of cam 120 and cam 124 has a notch 123 to alternately break contacts in opposing micro-switches 126. The two switches 126 alternately turn motor 66 on and off at 180 degree cycles and cause brake assembly to alternately fully retract or fully engage the floor. As best seen in FIG. 21 and FIG. 22, four springs 130 engage an internal flange of bracket 102 and shafts 104 and 105 in order to assure constant maximum braking force.

The various components, features and aspects of the present invention may be made of any suitable materials such as plastic, wood, extruded aluminum, other metal or any other suitable materials. Aluminum extrusions are preferred for the frame components.

An invention has been described in terms of preferred embodiments thereof which fulfill each and every one of the objects, aspects and features of the present invention as set forth hereinabove and provide a new and useful equipment column of great novelty and utility for use in a hospital room.

Of course, various changes, modifications and alterations in the teachings of the present invention may be contemplated by those skilled in the art without departing from the intended spirit and scope thereof. As such, it is intended that the present invention only be limited by the terms of the appended claims.

Having thus described the invention, what is claimed and desired to be secured by Letters Patent is:

1. A movable medical equipment support column providing internally mounted gas rails and electrical raceways connected to service supply sources through ceiling mounted conduits, the support column comprising;

two pair of oppositely positioned vertically extending front and rear frame members, a cap supported by a top portion of the frame members, a base supporting a bottom portion of the frame members, multiple wheel means for providing contact between the support column base and a floor surface, the wheel means mounted in the base, multiple horizontally extending cross members interconnecting the front two frames members and the rear two frame members, a pipe connecting a first arm of a double articulating arm containing gas hoses and electrical conduits interconnecting the ceiling mounted conduits to gas rails and electrical raceways in the cap, a second arm of the double articulating arm mounted to a ceiling, bumper handles covering a portion of each front frame member containing a switch for electrically releasing a brake mounted in the base, an equipment support frame pivotally attached to at least one front frame member, at least one gas flow meter mounted on a cross member, the front and rear frame members containing raceways interconnected to raceways in the cap receiving electrical conduits and gas lines from the double articulating arm, a patient monitor pivotally attached by a support arm to a shaft connecting the first arm of the double articulating arm to a top portion of the frame members, the support column providing open space for communication between persons on opposite sides of the column to allow visual contact with a patient when on opposite sides, and the support column movable in a range of up to 340° around a center of rotation to provide patient services at any position for multiple care providers rendering patient assistance.

2. A movable medical equipment support column according to claim 1 wherein the multiple wheel means are four multi-directional casters.

3. A movable medical equipment support column according to claim 2 wherein a brake plate is mounted in the base controlled by a motor assembly so that upon actuation of the switch the brake plate raises off a floor surface and allows the multi-directional casters to move.

4. A movable medical equipment support column according to claim 3 wherein the switch for electrically releasing the brake plate is a membrane switch.

5. A movable medical equipment support column according to claim 1 wherein a pivoting locking mechanism attached to at least one front frame member permits movement of an intravenous equipment support frame outwardly from a position between the front frame member and a back frame member to a point about 135° from the plane between the front and back frame members.

6. A movable medical equipment support column according to claim 1 wherein there are at least four horizontally extending cross members for supporting medical equipment and a horizontal platform for supporting a computer.

7. A movable medical equipment support column providing internally mounted gas rails and electrical raceways connected to service supply sources through ceiling mounted conduits, the support column comprising;

pairs of opposing front and rear vertical frame members containing gas rails and electrical raceways, a cap supported by a top portion of the frame members, a base supporting a bottom portion of the frame members, means for providing contact between the base and a floor surface and a means for preventing movement of the equipment support column mounted in the base, double articulating arms attached to a ceiling at a first end and to the cap at a second end, a interior portion of the double articulating arms containing high voltage electrical conduits, low voltage electrical conduits and multiple gas lines feeding to the pairs of opposing front and rear frame members, multiple horizontal cross members removably connecting the front frame members and multiple horizontal cross members removably connecting the rear/frame members, and the equipment support column having open front, rear and side portions to permit access to equipment mounted on the horizontal cross members with no visible gas conduits or electrical conduits outside the equipment support column.

8. The movable medical equipment support column according to claim 7 wherein the column moves in a path up to 340° around a center of rotation.

9. The movable medical equipment support column according to claim 7 wherein a patient monitor is attached to an arm at an end distal from an attachment of the arm to a shaft connected to the cap.

10. A movable medical equipment support column according to claim 7 wherein the means for preventing movement of the equipment support column is a brake pad driven by a motor mounted in the base and the motor is electrically actuated by an electrical switch mounted on a front frame member.

11. A movable medical equipment support column according to claim 7 wherein a gas block is attached to one of the horizontal cross members and a flow meter is mounted on the gas block and a gas conduit connects the flow meter to a gas rail mounted between vertical frame members.

12. A movable medical equipment support column according to claim 7 wherein an intravenous support frame is pivotally mounted on one of the front vertical frame members and the support frame moves from a position between a front and rear vertical frame member outwardly up to about 135°.

* * * * *